March 5, 1929.   W. STELZER   1,704,112
AIRCRAFT
Filed March 9, 1928   2 Sheets-Sheet 1

Witness:

Inventor:
William Stelzer

March 5, 1929.  W. STELZER  1,704,112
AIRCRAFT
Filed March 9, 1928  2 Sheets-Sheet 2

Witness:
Friedy Heisler

Inventor:
William Stelzer

Patented Mar. 5, 1929.

1,704,112

UNITED STATES PATENT OFFICE.

WILLIAM STELZER, OF CHICAGO, ILLINOIS.

AIRCRAFT.

Application filed March 9, 1928. Serial No. 260,325.

This invention relates to ornithopters deriving their chief support and propelling force from flapping wings, or more particularly, to an aircraft that has centrally positioned, balanced transverse wings, oscillating about axes that are parallel to the longitudinal axis of the aircraft, whereby the airfoils of the said wings are rotatably mounted on their respective supporting members or spars, the line of action or lift being rearward of the axes about which the wing-sections are rotatable, in combination with springs that tend to pitch the said airfoils within such limits where the wing sections incline in a negative direction when rapidly beating downward, thereby imparting to the surrounding air a downward and backward thrust, the resultant reaction acting on the aircraft obliquely upward and forward as lift and thrust.

The object of the invention is to provide an aircraft with flapping wings, in order to impart to a largest possible mass of air the smallest possible acceleration downward and backward to produce lift and thrust in the most economical manner for the sustension and propulsion of the aircraft.

Another object is to impart to the wings a propulsive action to eliminate propellers and the losses resulting therefrom.

It is well known that when a given unit of energy imposes on a large mass of air a small acceleration, the reactant force is greater than that when the same unit of energy imposes on a small mass of air a great acceleration. To comply with this axiom I imparted to the entire wings the action of accelerating air downward and thereby attaining the first named object.

On present day airplanes lift is produced by accelerating air downward by means of a power plant projecting an airfoil through the air. The energy is transmitted to the said airfoil through a propeller accelerating a comparatively small mass of air backward, the acceleration imparted to the said air constituting the major part of the propeller losses; therefore, only a fraction of the initial power output of the engine is transmitted to the airfoil to accelerate the air about it downward at the expense of the propulsive thrust. It is quite manifest that, theoretically, the elimination of propeller losses would produce an aircraft that has a multiplied efficiency. A power plant would be required that produces only such a percentage of the power output of an engine in a conventional airplane as the percentage of the propeller efficiency of the said conventional airplane, such a decrease in power requirement would decrease the weight of the power plant, whereby the wing area necessary to support it decreases and the weight of the structure to support the power plant as well as the amount of fuel likewise decreases, the decrease in drag resulting from smaller wings would in turn permit a still lighter power plant and so forth. In other words, the elimination of the propeller losses is reflected throughout the whole structure. This and other reasons led to my present invention in which the power of the engine is transmitted directly to the wings, to generate lift and thrust, whereby the induced drag which is unavoidable in airplanes with fixed carrying planes, is converted into thrust.

Ornithopters, to which this invention partially relates, are already known as aerial vehicles imitating the flapping motions of birds. Even though inventors of ornithopters do not seem to have been acquainted with the theory of bird flight and therefore have met with failure, it is nevertheless evident that birds are far superior in efficiency to present day airplanes, taking into consideration their heavier gross weight per unit of power in comparison with that of the airplane. The failures of certain ornithopters were due to the fact that the latter were built to simulate the swinging or flapping motions of birds, but neglecting the principle of bird flight. Birds have the advantage of possessing light wings, whose kinetic energy while flapping is very small, so that the birds have no difficulty in reversing the direction of motion of their wings. As weight increases in the cube with the linear dimensions, it is quite obvious that the moment of inertia of large wings plays an important part in ornithopters. This particular feature is duly considered in my invention by providing balanced wings and by combining them directly with the engine.

Another object of the invention is to make the wings automatically adaptable to the relative direction of wind while oscillating, this object forming part of my invention filed November 17, 1927, Serial Number 240,798, and the aim of the present invention is to combine the object of the first named invention with oscillating wings; whereby the airfoils which are rotatable about single spars are intersected into a multiple number of individually spring-controlled panels, or the said airfoils are devised to warp easily in a manner described hereinafter. The purpose is to effect an equal angle of attack on all wing sections, whose amplitude of oscillation increases toward the wing tips, as, for instance, the wing ribs near the tip of a descending wing will be more inclined than the wing ribs closer to the roots of the said wings, whereby the forward thrust increases towards the tips, while the lift is nearly equal on all wing sections because the leading and trailing edges gradually contract towards the tips. This quality of distributing the lift equally on the wings brings about a decrease of the bending moment in the wing truss and cuts down the weight of it.

Conforming to the purpose of adaptability of the aircraft to travel at variable speed, the present invention aims at imparting to the carrying planes a direct acting and movability within wide limits. For this purpose the airfoils were relieved of any fixed motion or rigidity as far as possible and provided with springs impressing a pitching moment thereon, thus making the angle of wingsetting adaptable to the relative direction of the wind so that the angular displacement of the wing sections decreases with the increase of travelling speed, resulting in an increase in lift, which characteristics make an aircraft embodying my invention highly efficient in flying at high altitudes where the thrust required is only a small fraction of the lift required for sustension of the aircraft, present day airplanes being doomed to reach a comparatively low absolute ceiling due to the increased propeller losses at high altitudes. It is quite evident that an aircraft that is able to travel economically at high altitudes can attain great speed on account of the decreased density of the air, thereby reducing time and cost of aerial travel.

Another object of the invention is to provide an engine that produces movements which coincide with the movements of the wings, whereby it is possible to transmit the reciprocation of the working elements of the said engine directly to the wings. This arrangement brings about a close association between the function of the engine and that of the wings, a sure working of the engine is effected by imparting to the said oscillating wings that have a great moment of inertia the action of further compressing the combustible gases to a density where self ignition occurs, should the electric ignition fail. As the reciprocation of the working elements of the engine is relieved of any fixed amplitude, the motion of the wings as well as the function of the engine is very smooth and flexible, preventing any dangerous stresses in the wing structure. While the kinetic energy accumulated in the accelerated wings is usefully transmitted to the engine by compressing the combustible gases therein at the end of a stroke, the described function also effects a quick reversal at the end of a stroke.

Other objects of the invention will appear in the following detailed description, wherein:

Fig. 1 is a top plan view of the aircraft.

Fig. 2 a vertical sectional view taken through the longitudinal axis of symmetry of an aircraft constructed in accordance with this invention, the reciprocating elements being shown at the bottom of their stroke; the rear portion of the body is omitted in order not to encumber the drawing.

Fig. 4 is a cross section through a wing made by a plane perpendicular to the axis of the said wing and illustrates the mode of mounting the wing ribs on a single spar.

Fig. 5 illustrates the angular displacement of an airfoil section or wing rib from the longitudinal axis X of the aircraft during a period of oscillation in a direction of flight indicated by the arrow 49, while Fig. 6 is a fragmentary top plan view of a modified form of the wing structure.

Similar reference characters refer to similar parts throughout the several views of the drawings. The terms employed herein are used in the generic and descriptive sense and therefore are not intended primarily as terms of limitation.

The forward wing 7, as well as the rearward wing 8, in its entirety is considered herein as a single wing, but its left and right portions are qualified as left and right wing respectively as seen by an observer looking in the direction of flight.

Figure 1:
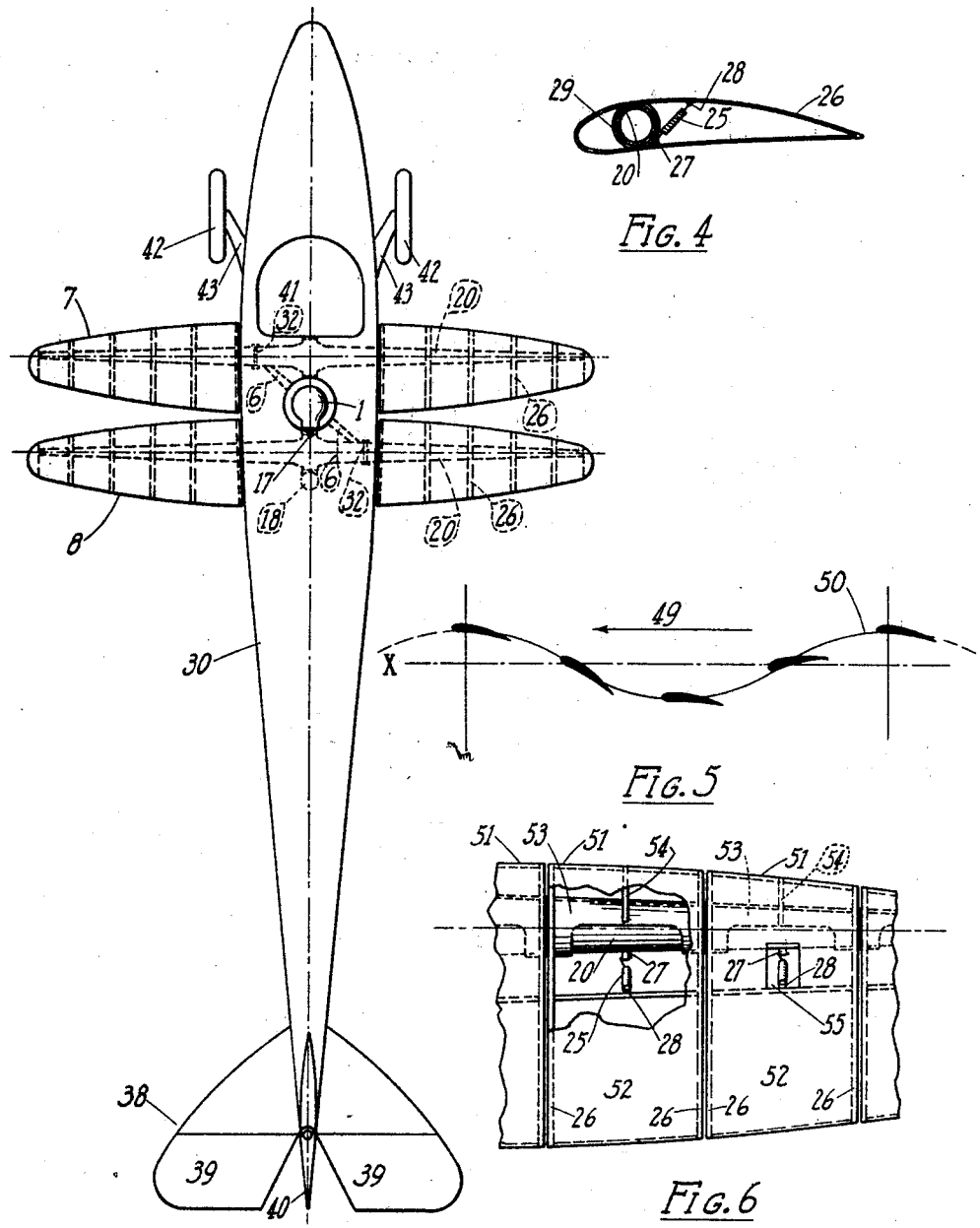

Referring now to the drawings in detail, there is shown in Fig. 1 the fuselage 30 which may be of any desired type. The rearward position thereof comprises the usual empennage 38 consisting of the transverse elevating planes 39 and a vertical rudder 40, provided with the conventional fins, these elements being operable from within the fuselage 30 at a convenient point, the control stick 44 being shown in Fig. 2 as one of the means applicable for the operation of the said control surfaces. The forward part of the fuselage comprises the cock pit 41 with accommodations for the pilot, the seat 47 rigidly connected with the fuselage 30 being shown in Fig. 2. The described arrangement naturally appertains to small aircraft and may suitably be changed in aircraft serving different purposes as for instance large passenger or freight carrying aircraft. The landing gear comprises the two landing wheels 42 supported by the symmetrically disposed joists 43 extending outward and downward from the fuselage 30.

The parts thus far described are shown only somewhat diagrammatically, since they may be of usual construction and their details are unimportant as relating to the dominant features of this invention.

To the fuselage 30 is secured a two cylinder internal combustion engine whose two coaxial vertical cylinders 1 are mounted oppositely to the fuselage 30 and are substantially similar in construction and operation so that one only need be described in detail, similar reference characters being employed in the drawings to denote similar parts of both.

Both cylinders 1 are mounted so that their heads point away from the centroids of the fuselage. Describing the upper cylinder 1 mounted on top of the fuselage 30, it is provided with the usual spark plugs 17 and comprises the combustion chamber 24 and the radial cooling ribs 4 transferring the waste heat into the atmosphere. In the said cylinder 1 reciprocates the piston 2 rigidly connected with the single piston rod 5 sliding through the airtight stuffing box 11, the latter effecting the airtightness of the chamber 3 and preventing the gases therein from escaping into the atmosphere. This chamber 3 communicates with the standard carburetor 12 (which is common for both cylinders) through the tube 13 and the pocket 35, bearing the flap valve 14, and with the middle part of the cylinder through the orifice 15, so that the compressed gas mixture in the chamber 3 can expand into the combustion chamber 24 when the sliding piston 2 has reached the end of its working stroke. The piston 2 as well as the cylinder 1 is of a curved form of head in order to deflect the gas mixture flowing through the orifice 15 in such a direction as to force the spent gases into the atmosphere through the exhaust port 16 which is uncovered periodically by the piston 2 at the end of a working stroke. This exhaust port 16 in the cylinder wall is placed slightly closer to the cylinder head than the orifice 15, in order to relieve the pressure of the exhaust gases before the pre-compressed charge of new medium from the chamber 3 is admitted into the working end or combustion chamber 24 of the cylinder.

The electric ignition system of the described engine is the usual, except that the contact springs 23 replace the timing apparatus normally used in combustion engines having revolving shafts. The contact spring 23 on the right wing side mounted to the fuselage 30 makes contact with the forward wing spar 20 when the reciprocating elements of the engine have assumed their lowest position, hereby closing the current that effects the ignition of the combustible gases in the lower cylinder 1; the opposite contact spring 23 closes the current that causes the ignition in the upper cylinder 1, when the reciprocating elements have ascended.

The necessary auxiliary devices for the engine, as oiling and cooling system and fuel supply are the usual employed in standard combustion engines, and, forming no part of this invention, will not be shown in the drawings, nor described, as any of the existing systems can be used without affecting the dominant features of the invention. The fuel tanks, for instance, may be placed besides the engine in order to be in the center of gravity, and close to the carburetor 12, connected therewith through a suitable fuel feeding system.

The wing spars or trusses 20 rest on and are mounted rotatably on the axles 10, the forward axle 10 resting in the flanges 21 and 26 rigidly secured to the seat 47 and to the upper communicating tube 13 respectively, said flanges preventing the forward transverse wing spar 20 from displacement along the said axle 10. The bottom of the upper cylinder 1 has a tubular projection 33 to receive the axle 10 whose rear portion rigidly rests in the hanger 18 projecting downward from the top structure of the fuselage 30, the rear spar 20 being properly positioned between the hanger 18 and the collar 19. The axles 10 are of smooth finish in order to permit the spars 20, whose central bearings 31 are perpendicular to the axes of the spars 20, to oscillate freely in a plane perpendicular to the axes of the said axles.

The same features may be obtained by employing in lieu of the axles 10, fore-and-aft cylindrical trunnions securely connected or formed on to the spars 20, the cylindrical trunnions turning in 21, 36, 33 and 18 respectively.

The reciprocating elements of the described engine impart to the spars 20 an oscillation which is transmitted by means of the horizontal arms 6 extending from and formed onto the piston rod 5. For the purpose of decreasing weight these arms 6 taper toward their terminations, which form the ball and socket joints 22. The balls which can turn in almost every direction form the lower portion of the connecting links 9 terminating in a fork pivotally connected to the pins 32 which are substantially parallel to the axles 10. Consequently the connecting links 9 cannot turn about the axes of the spars 20, but they can adapt themselves to the variable distance from the center of the aircraft while the spars oscillate.

The two pairs of rotatable balanced wings 7 and 8 comprise the aforesaid spars 20 tapering toward their tips, and the suitably spaced wing ribs 26 mounted rotatably about the spars 20 so that they can oscillate about the axes thereof. The ribs 26 being all alike in construction, and describing one, in detail, this rib, as best shown in Fig. 4, comprises a circular short sleeve 29 adapted to turn freely about the spar 20 and being placed near the entering edge of the wing rib so that the line of action of the resultant lift acting on the wing rib is aft of the centroids of the sleeve 29, the latter may be provided with ball bearings to decrease friction. Motion endwise is prevented by two collars, which may be adjustably held in place by set screws, these elements being not shown in the drawings.

The helical tension spring 25, connected to the lug 27 extending from the spar 20, and to the lug 28 on the upper cord of the wing rib 26, impresses a pitching moment on the latter to an extent within such limits where the wing rib 26 inclines in a negative direction when beating downward on the air. This spring 25 may be adjustable either by displacing the lug 27 or by providing means to adjust the length of the spring from within the fuselage, the latter arrangement would permit the control of the lateral stability of the aircraft by means of adjusting the springs and consequently the lift at will.

The wings 7 and 8 are covered with wing fabric in the usual manner, except that they are deprived of any rigidity so as to warp easily, because the tips of the wings move faster than the portions near their roots and consequently the angular displacement of the outer wing ribs will be greater than that of the ones nearest the fuselage 30. The wing ribs 26 adjacent to the fuselage 30 are placed so close that they nearly touch the fuselage skin in order to prevent any leakage of air. In the fuselage 30 slots 34 are provided, inside of which swing the spars 20.

A modification of the wing construction is illustrated in Fig. 6 showing a portion of a wing; a cross section therethrough would look similar to Fig. 4. Instead of applying a flexible wing fabric to permit warping of the wings as described hereinbefore, a rigid means of wing covering is employed, such as plywood or veneer. In order to permit warping, the fore-and-aft members rotatable about the wing spars 20 are divided into separate, individually spring-controlled airfoils or wing panels. These are similar in construction so that one only need be described in detail, the only variation being in size, because the wings as well as the spars taper toward the tips. Describing now a panel 51, it comprises the sleeve 53, to whose ends are rigidly secured the wing ribs 26 giving the wing covering 52 its proper form. This covering may be of veneer or plywood, but also doped fabric may be used when the ribs 26 are strengthened transversely by tie rods or bracings. The former rib 54 extends from the leading edge of the panel 51 to the middle portion of the sleeve 53 and serves to assist in maintaining the form of the panel where the curvature of the airfoil is sharpest. The sleeve 53 is provided with antifriction bearings and is adapted to turn on the spar 20 from which projects a dismountable lug 27 holding a tension spring 25 whose other end associates with the upper portion of the panel. This spring 25 impresses a pitching moment on the panel in a manner described hereinbefore. In order to clear the lug 27 when rotating, the aft middle portion of the sleeve 53 is removed. The latter extends slightly beyond the sides of the ribs 26 in order to prevent friction between adjacent panels. It is of course essential that the space therebetween is very small to prevent the flow of air therethrough. Endwise displacement of the panels may be prevented by safety collars or cotter pins secured to the tips of the spars 20 and to the roots thereof adjacent to the panels nearest to the fuselage 30. These panels may be easily dismounted from the spars 20 by removing the lugs 27 and the safety collars or cotter pins. The springs may need adjustment and for this purpose the removable inspection windows 55 was provided.

The same objects may be attained by connecting these panels 51 hingedly to the spars 20, whereby the latter may serve as the entering edges of the airfoils.

Having thus described the essential elements of my invention, I will now illustrate the operation of the same.

Supposing the aircraft is at rest on the ground and its engine has to be started, the piston rod 5 must be reciprocated by swinging the wings 7 and 8 about the axles 10 in order to fill the chambers 3 with a combustible gas-mixture that is transferred into the combustion chamber 24 and compressed therein, thereafter being electrically ignited to produce the mechanical power necessary for continuous reciprocation of the pistons 2 and the elements connected thereto.

Figure 2:
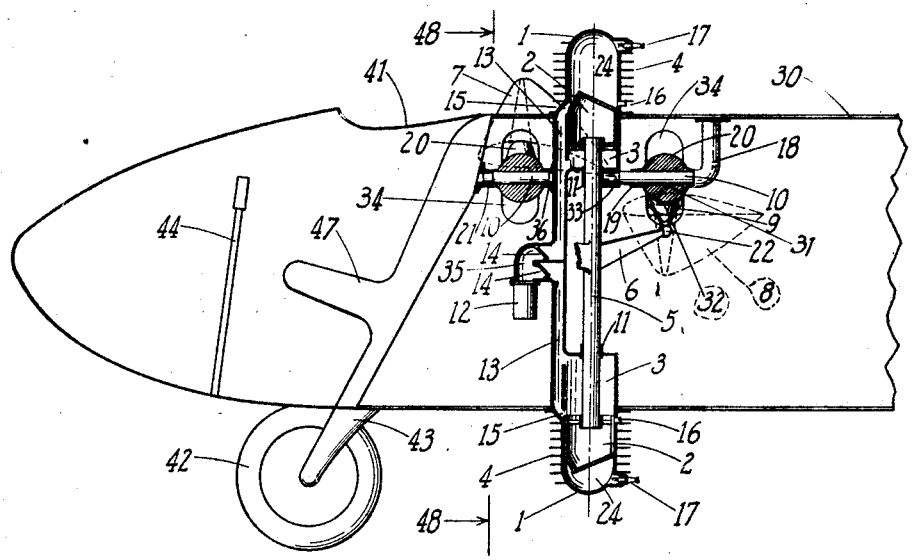

Assuming the pistons 2 to be at the bottom position as illustrated in Fig. 2, the exhaust port 16 of the upper cylinder 1 is open and the burnt gases in the said cylinder can escape into the atmosphere. The orifice 15 is uncovered in slight retardation in respect to the exhaust port 16; whereby the compressed gas-mixture in the chamber 3 and in the communicating tube 13 can expand into the combustion chamber 24. As the piston 2 has irregular form of head, the gas-mixture passing into the cylinder is deflected toward the head thereof and thus replaces the waste gases entirely. At the same period of time the contact spring 23 interconnecting the circuit pertaining to the spark plug 17 of the lower cylinder 1 is touched by the right half of the forward wing spar 20, the closing of the circuit causing the ignition of the compressed gases in the combustion chamber 24 of the said lower cylinder 1, whereby the pistons 2 start upward due to the expanding gases in the lower combustion chamber 24, compressing the combustible gas-mixtures in the upper combustion chamber 24 and in the chamber 3 of the lower cylinder. In the upper chamber 3 a suction is created and as the orifice 15 is covered by the piston 2, air is forced to flow through the carburetor 12 into the upper communicating tube 13 and into the chamber 3, thereby unseating the upper check valve 14. The lower check valve 14 is pressed to its seat and prevents the escape of the gas-mixture which is being compressed in the lower chamber 3. As the pistons 2 ascend beyond a certain point the exhaust port 16 in the lower cylinder 1 becomes uncovered and permits the burnt gases to expand into the atmosphere. The pistons continue in their motion at the expense of their kinetic energy, thus the lower piston 2 passes the orifice 15 and allows the compressed gas-mixture in the chamber 3 to expand into the combustion chamber 24 and to replace the spent gases. While this takes place, the compressed combustible gas-mixture in the combustion chamber 24 of the upper cylinder 1 is ignited by a spark caused by an electric current flowing through a circuit that is closed by the left half of the forward wing spar 20 when touching the contact spring 23. While the pistons reverse their motion, the upper flap valve 14 falls to its seat and the lower one opens, this giving passage to the gas-mixture issuing from the carburetor 12, where air mixes with carbureted fuel, into the chamber 3 of the lower cylinder 1, wherein a suction is created, while in the combustion chamber 24 of the said lower cylinder the combustible gas-mixture is being compressed. As the upper piston 2 descends past the exhaust port 16 and orifice 15, the expanded gases above the said piston 2 escape into the atmosphere and are replaced by fresh combustible gases flowing from the chamber 3 of the upper cylinder, and from the communicating tube 13, this action taking place in a manner identical with that described above for the lower cylinder. The compressed gases in the combustion chamber 24 of the lower cylinder 1 are ignited again when the contact spring 23 touches the spar of the right forward wing, the pistons return, starting the next period of reciprocation perfectly similar to the one described.

The pistons 2, the rod 5 and the arms 6, which form a single rigid piece that reciprocates, impart to the wings 7 and 8 an oscillation about the axles 10, whereby the said wings 7 and 8 rotate in opposite directions, that is, for instance, during a down stroke of the pistons, an observer looking in the direction of flight sees the wings 7 rotating counterclockwise and the rear wing 8 clockwise, reversing their directions of motion when the said pistons start the upward stroke.

It is evident that, in horizontal flight, the effective angle of attack of a vertically reciprocating airfoil having a fixed angle of wing setting so that the wing cord is parallel to the mean direction of flight, would be negative during ascension and positive during descension. In order to produce a positive angle of attack throughout a period of reciprocation it is necessary that the airfoil pitches during the upstroke. During a down stroke said airfoil could incline in a negative direction to a certain extent and still maintain a positive effective angle of attack; the resultant force would then be upward and forward, its components being lift and thrust. Conforming to this analysis, the wing ribs 26 are mounted rotatably about the tubular spars 20, the axes of the latter being forward of the center of pressure, i. e. forward of the line of action of the resultant airforce. In consequence, the wind impinging on the wings 7 and 8 tends the latter to attain the zero-lift-angle. This tendency is counteracted by a pitching moment impressed on the ribs 26 by means of the springs or expansible members 25. The latter are adjusted to offer a resistance within such a capacity as to be overcome by the tendency of the wings 7 and 8 to incline when beating downward. Conforming to the requisite lift for sustension of the aircraft in rectilinear flight, it is necessary to adjust the tension of the springs 25 so that an angle of attack results that does not generate too great or too little lift, even though the latter can be regulated by pitching or inclining the entire aircraft.

Figure 3:
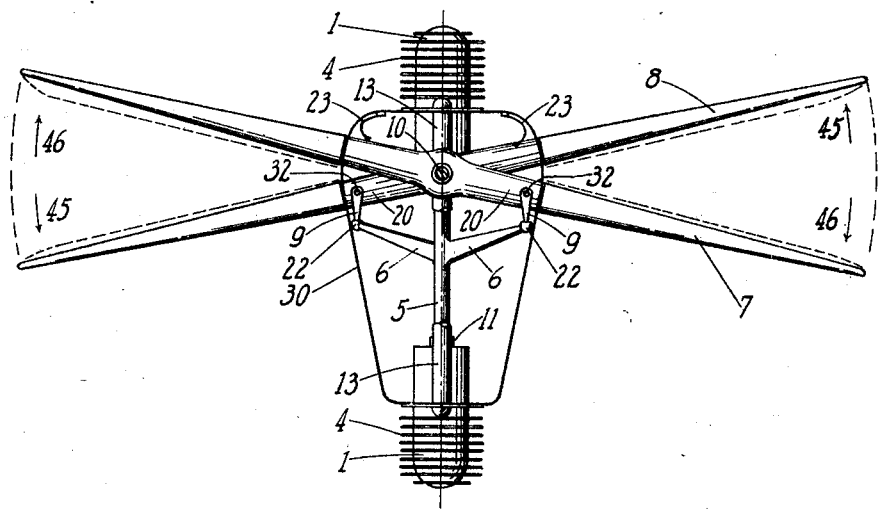
Fig. 3 is a section taken substantially along the line 48—48 of Fig. 2, the position of the movable parts corresponding with a down stroke of the pistons shortly before reaching the bottom position.

Referring now to Fig. 3, the view illustrates the displacement of the wing ribs 26 from the horizontal, corresponding with the assumption that the pistons 2 are descending. The dotted lines indicate the trailing edges, which are at a higher elevation than the entering edges in a descending wing and at a lower elevation in a rising wing, hence the descending wings are inclined and do not only produce lift, but also thrust, in the manner described hereinbefore. As the forward spar 20 rotates in the direction indicated by the arrows 46, the left wing 7, whose geometrically negative angle of attack increases toward the wing tip, generates lift and thrust. Similar action takes place in the right wing 8 supported by the rear spar 20 which turns in the direction indicated by the arrows 45. The line of action of the lift induced by the beating wings thus includes the centroids of the engine, that is, it acts centrally on the fuselage during any period of rotation. The reversal of the motion of the pistons 2 effects also the reversal of the motion of the wings 7 and 8, so that the forward wings 7 rotate in the direction indicated by the arrows 45 and the rear wings rotate in the opposite direction, changing their geometrical angle of attack respectively.

A perfectly balanced and continuous lifting and propelling force acting on the center of the aircraft is attained during flight by the described arrangement whereby the wings are mounted in tandem fashion and oscillate or rotate in mutually opposite directions, a useful dynamic reaction being induced alternately in two opposite wings beating downward.

To follow up the consecutive positions of a wing rib during a period of oscillation in forward flight, Fig. 5 was added, wherein, starting from right to left, the first airfoil profile indicates the top position of a rib 26, corresponding with the top position of the pistons 2. Conforming with Fig. 3 the said profile would be a cross section through the forward right wing 7 looking toward its tip. Assuming now that the said wing oscillates while the fuselage 30 travels forward in rectilinear flight, the centroids of the spar 20 about which the wing rib is rotatable, describe a wave line denoted in Fig. 5 by 50.

As the wing rib beats downward illustrated by the second figure in Fig. 5, the airforce and the resulting reaction and consequently the tendency of the rib 26 to attain the zero-lift-angle becomes very great, because the latter is negative.

The resistance of the spring 25, whose function is to impress a pitching moment on the rib 26, increases during the expansion, i. e. with the increase in inclination of the rib 26. Thus the pitching moment impressed on the latter counterbalances the tendency of the rib 26 to incline negatively, the latter maintaining a positive effective angle of attack that is geometrically negative, whereby the useful reaction is lift and thrust. As the wing decelerates, the airforce becomes smaller and the rib turns in the positive direction, i. e. the inclination of the rib and the induced thrust decrease; whereafter in the reversing position illustrated by the third figure from the right in Fig. 5, the rib attains a positive geometrical angle of wing setting that increases as the wing accelerates upward, that is, the pitch thereof increases, the position being illustrated by the fourth figure in Fig. 5. The cord of the rib is shown slightly steeper than the line 50, along which the spar 26 travels, and the lift generated is almost zero due to the contraction and the resulting slackening of the spring 25. This last described arrangement, whereby practically no lift is generated in an ascending airfoil, prevents the introduction of the induced drag that is adherent to airplanes having fixed airfoils. While approaching the top position, the wing decelerates and the geometrical angle of attack consequently decreases, but the effective angle of attack and the resulting lift increases slightly, owing to the greater resistance offered by the spring 25. The last figure in Fig. 5 illustrates the position assumed by the wing rib at the end of the period, this being the transition to the next period of reciprocation perfectly identical with the one described.

In this preferred embodiment of my invention an increased stability is attained by providing a comparatively long fuselage dampening the pitching moment impressed thereon, by the oscillating wings, nevertheless, this, as well as the means for the control of the lateral stability (not shown in the drawings) form no part of the present invention. The last named means for instance can be provided in the form of any standard control, such as ailerons or means to warp the wings. A very simple control may be produced by providing means to vary the resistance of the springs 25 manually; whereby the lift can also be controlled at will during flight and may be adjusted to the lighter load caused by fuel consumption.

It shall be well understood that the fundamental idea and theory of this invention relates to my invention filed for Letters Patent on December 17, 1927, Serial Number 240,798; which invention I described as being useful for the utilization of the energy contained in turbulent air for the purpose of inducing useful dynamic reactions such as lift and thrust. This function naturally appertains also to the present invention, as it presumes in combination with an airplane body, an airfoil that is rotatable about its supporting member located near the leading edge, and springs impressing a pitching moment on the airfoil. The present invention is particularly adaptable to fluctuating air currents of short wave length, because each airfoil portion of the wings is independent of adjacent portions and individually adaptable to the flow of the air currents. The function of the wings under the influence of such air currents will be briefly described:

Assuming that an aircraft embodying my invention is projected forward through turbulent air as occurs during strong winds, when the air not only flows horizontally, but also oscillate vertically, lift is generated in the wings 7 and 8 during an upward current. Instead of the induced drag resulting under such conditions in an aeroplane whose fixed carrying planes are pitched, thrust is induced owing to the inclination of the movable airfoils whose pitching tendency is overcome by the force of the upwardly flowing air. When the current reverses its direction of motion, that is, the air flows downward, the airfoils consequently pitch, thereby preventing the air current to press the aircraft down, the latter travelling at the expense of its kinetic energy until the air current reverses.

While there are herein shown and described the preferred embodiments of my invention, it shall nevertheless be understood that changes may be made without departing from the broad scope of the invention; some of the most obvious modifications will be briefly stated:

Taking first the power plant, the embodiment described hereinbefore is preferred, because of its harmonic coaction with the wings, as well as its simplicity and reliability, nevertheless, any power plant such as internal or external combustion engine may be employed. In a conventional engine having a revolving drive-shaft, a crank may be employed to convert rotary into reciprocating motion. The latter may be transmitted to the wings by means similar to those described hereinbefore or by any other appropriate means. In an aircraft embodying my invention, but excluding the power plant in order to be suitable for soaring flight, means can be provided to operate the wings by the feet.

The described variations may be employed in connection with the oscillating wings, whose arrangements and construction described hereinbefore form an important and dominant part of the invention. Yet the simplified engine described hereinbefore and illustrated in the drawings is of equal importance because it may be applied to any aircraft deriving its chief support and propelling force from oscillating, reciprocating or flapping wings. Due to this manifold application of the said engine, changes may be made to conform with the motions of the wings. It shall be well understood, that the main feature of the engine is the direct reciprocation of the drive elements, the revolving elements being dispensed with, therefore the scope of this part of the invention is very broad. The feature stands when a single cylinder is used, when a multiple number of cylinders are used, or when compression ignition and fuel injection are applied.

The positions of the wings may be subjected to change in different types of aircraft and when said wings are combined with different kinds of power plants. For instance, in an aircraft of short dimensions, one of the two wings 7 and 8 may be dispensed with, the remaining wing oscillating at a high frequency. Sufficiently large fins may be placed on the fuselage to dampen the alternating banking moments impressed on the aircraft by the oscillating wing.

In large aircraft it may be convenient to place the wings one above the other, or transversely alined, or a multiple number of oscillating wings may be employed.

The principle of the invention may also be embodied in a structure wherein the wings are unbalanced so as to resemble structurally and functionally the wings of a bird, or generally, the described principle of rotatably mounting the wing ribs or panels that are tended to pitch by means of springs or other expansionable members, on a spar or wing truss, so that the axis about which the wing ribs or panels can swing or rotate, is located in advance of the center of pressure, can be applied to any oscillating, swinging, flapping or reciprocating airfoil in order to produce lift and thrust for the purpose of sustension and propulsion of aircraft. Therefore, I do not desire to be limited in the application of my invention nor in the appended claims to the particular embodiment, pointed out in the affixed drawings.

Further embodiments, modifications and variations may be resorted to within the spirit and scope of the invention as here claimed.

I claim:

1. In an aircraft, in combination, mutually balanced transverse wings oscillating about axes that are parallel to the longitudinal axis of the aircraft, internal transverse supporting members for said wings, means for mounting the latter rotatably to said supporting members so that the line of action of the resultant airforce is aft of the transverse axes about which said carrying planes are rotatable, and resilient means to impress a pitching moment on said wings.

2. In an aircraft, in combination, mutually balanced transverse wings oscillating about slightly inclined axes that are included in a plane containing the longitudinal and the normal axis of the aircraft, transverse, internal supporting members for said wings, means to connect said wings pivotally to the said supporting members so that the lateral axis containing the pivots are in advance of the line of action of the resultant airforce, resilient means to impress a pitching moment on the said wings, within such limits where the said wings incline in a geometrically negative direction when beating downward, that is, the trailing edges attain a higher elevation than the leading edges, while the induced angle of attack resulting from the downward motion of the wings increases.

3. In an aircraft, in combination, mutually balanced, transverse continuous wing spars oscillating about axes that are parallel to the longitudinal axis of the aircraft, wing ribs rotatably mounted about said spars so that the line of action of the resultant airforce is aft of the said spars, resilient means to individually impress a pitching moment on each of the said wing ribs, means to prevent motion sidewise thereof, and wing fabric covering the wing structure to form a properly shaped warpable wing.

4. In an aircraft, in combination, mutually balanced, transverse continuous wing spars oscillating about axes that are parallel to the longitudinal axis of the air craft, adjacent wing panels rotatably mounted about each of said spars, so that the line of action of the resultant airforce is aft of the centroidal axes of said spars, each panel being of rigid structure and comprising wing ribs, means to provide free rotation of said wing ribs about said spars and rigid means of wing covering, elastic means to impress a pitching movement on each of the said wing panels, and means to prevent motion sidewise of said panels.

5. In an aircraft, in combination, mutually balanced, transverse continuous wing spars oscillating about axes that are parallel to the longitudinal axis of the aircraft, adjacent wing panels hingedly connected to each of the said wing spars, so that the line of action of the resultant airforce impinging on said panels is aft of the lateral axis containing the pivots of the hinges, and elastic means to impress a pitching moment on each of the said wing panels.

6. In an aircraft, in combination, transverse, mutually balanced wings oscillating about an axis that is included in a plane containing the longitudinal and the normal axis of the aircraft, said wings being deprived of any torsional rigidity so as to warp easily, transverse internal supporting members for said wings, placed forward of the line of action of the resultant airforce so that the latter tends the said wings to attain an angle of attack where the lift is zero, and resilient springs to tend to warp the said wings in a positive direction, i. e. to impress a pitching moment on the wing sections.

7. In an aircraft, in combination, a fuselage, an axle mounted longitudinally and centrally thereon, a single, transverse wing spar rotatably mounted on said axle, so that the tips of the spar extend equally outward and balance each other, airfoils pivotally mounted on said spar, whereby the line of action of the resultant airforce is rearward of the pivots, means to prevent displacement of the said airfoils along the said spar, spring means connected to each of the said airfoils and to the said spar to impress a pitching moment on the said airfoils, means to oscillate the said spar and the airfoils carried thereby about the said axle, whereby the amplitude of the swinging motion of the wing increases toward the wing tips.

8. In an aircraft, the combination of a body, a pair of transverse, centrally positioned wing spars rotatable about axes that are parallel to the longitudinal axis of the aircraft, airfoils pivotally mounted on said spars whereby the line of action of the resultant airforce is rearward of the pivots, means to maintain endwise location of the said airfoils, spring means connected to each of the said airfoils and to the said spars to impress a pitching moment on the said airfoils, and means to oscillate the said spars and the elements carried thereby about the said longitudinal axes in opposite directions.

9. In an aircraft, the combination of a body, an axle centrally and longitudinally mounted therein, two lateral wing spars in tandem fashion mounted on said axle, each of the said wing spars extending equally laterally outward so as to be balanced, airfoils rotatably mounted on each of the said wing spars, the supporting points, about which said airfoils are rotatable being located near the leading edge of said airfoils and forward of the line of action of the resultant airforce, spring means associating with each of the said airfoils to impress a pitching moment thereon, and means to oscillate said spars about said axle in relatively opposite directions.

10. In an aircraft, the combination of a body, two axles mounted therein, the longitudinal axis of the aircraft and the said axles being mutually parallel, the latter being placed one above the other and staggered, a transverse wing spar rotatably mounted on each of the said axles, each spar extending equally laterally outward so as to be balanced, airfoils rotatably mounted on each of the said wing spars, the supporting points, about which said airfoils are rotatable, being located near the leading edge of said airfoils and forward of the line of action of the resultant airforce, spring means associating with each of the said airfoils to impress a pitching moment thereon, and means to oscillate said spars and the elements carried thereby about said axles in relatively opposite directions.

11. In an aircraft, the combination of a body, an axle mounted on the left, and one on the right extremity of said body, the longitudinal axis of the aircraft and the said axles being mutually parallel, the latter being spaced equally from the axis of symmetry, a transverse wing spar rotatably mounted on each of the said axles, each spar extending symmetrically from the respective axles, so as to be balanced, airfoils rotatably mounted on each of the said wing spars, the supporting points about which said airfoils are rotatable being located near the leading edge of the said airfoils and forward of the line of action of the resultant airforce, resilient means associating with each of the said airfoils to impress a pitching moment thereon, and means to oscillate said spars and the elements carried thereby about said axles in relatively opposite directions.

12. In an aircraft, for the purpose of utilizing air currents for motive power, a body, a single centrally positioned transverse wing spar rotatable on an axle that is parallel to the longitudinal axis of the aircraft, airfoils pivotally mounted on the said wing spar, the pivots about which said airfoils are rotatable being located forward of the line of action of the resultant airforce, spring means associating with each of the said airfoils to impress a pitching moment thereon within such limits where the airfoils incline in a geometrically negative direction, that is, the trailing edges of the airfoils attain a higher elevation than the entering edges when an upward air current impinges on the said airfoils, thereby pressing the aircraft upward and forward, and means to oscillate the said spar and the affixed elements.

13. In an aircraft of the class described, in combination, a body, rotatable wing spars of tubular shape and tapering toward their extremities, bearings in the middle portions of said spars, axles adapted to said bearings, airfoils rearward of said spars and pivoted thereto, spring means tending to pitch said airfoils, means to oscillate said spars alternately and means to control the aircraft.

14. In an aircraft of the class described, in combination, a body, transverse, symmetrically disposed wing spars, fore-and-aft trunnions attached to the central portions of said spars, fixed bearings fitted to said trunnions, airfoils rearward of said spars and pivotally connected thereto, spring means tending to pitch said airfoils, and means to oscillate said spars and the elements carried thereby.

15. In an aircraft deriving its main supporting and propelling force from reciprocating, flapping, swinging or oscillating wings, in combination, a pair of spaced vertically positioned alined cylinders, a piston head in each cylinder, a piston rod connecting said heads, a combustion chamber in each of the said cylinders into which the combustible mixture passes and means in said combustion chambers for igniting said mixture, an intake port in each combustion chamber, means for opening said ports in proper sequence for the purpose of admitting the combustible gas-mixture, an exhaust port in each of the said cylinders, means for opening and closing said exhaust ports in proper sequence, a carburetor, intake tubes conjoining said carburetor with the cylinders, means to feed combustible gas-mixture into the combustion chambers when the respective exhaust ports are open, and means to interconnect said pistons with the wings to impart thereto the proper motion.

16. In an aircraft deriving its main supporting and propelling force from reciprocating, flapping, swinging or oscillating wings, in combination, a multiple number of coacting power units, each power unit comprising a pair of spaced vertically positioned alined cylinders, a piston head in each cylinder, a piston rod connecting said heads, a combustion chamber in each of the said cylinders, into which the combustible mixture passes and means in said combustion chambers for igniting said mixture, an intake port in each combustion chamber, means for opening said ports in proper sequence for the purpose of admitting the combustible gas-mixture, an exhaust port in each of the said cylinders, means for opening and closing said exhaust port in proper sequence, a carburetor, intake tubes conjoining said carburetor with the cylinders, means to feed combustible gas-mixture into the combustion chambers when the respective exhaust ports are open, interconnecting means for said power units to produce concurrent action thereof and proper displacement of the periods of reciprocation of the reciprocating elements, and means to connect the latter with the wings.

17. In an aircraft deriving its main supporting and propelling force from reciprocating, flapping, swinging or oscillating wings, in combination, a pair of spaced vertically positioned alined piston chambers, a piston head in each chamber, a piston rod connecting said heads, a carburetor, an intake tube connecting said carburetor with the piston-rod side of each chamber, a flap valve in each of the said intake tubes, an orifice in the middle portion of each of the said piston chambers, a tube communicating with each of the said first named intake tubes and with the said orifice on the respective piston chamber, said orifices being placed so that they are opened when the pistons are at the bottom of their stroke to admit the combustible mixture into the working ends of the said chambers, means therein for igniting said mixture, exhaust ports opposite said orifices, means for connecting said piston rods to the wings to oscillate the latter and to impart to the said wings the action of compressing the combustible gases until ignition occurs, and means to control the power plant.

18. In an aircraft, the combination of a body, a pair of transverse, symmetrically disposed wings in tandem fashion pivoted to said body, the transverse wing spars of said wings being positioned forward of the line of action of the resultant air force, spring means tending to increase the angle of attack of said wings, a pair of spaced, vertically positioned, alined cylinders, a piston head in each cylinder, a piston rod connecting said heads, a carburetor, orifices and exhaust ports in said cylinders, means to feed the combustible mixture into said cylinders and to remove the burnt gases therein, means for igniting said mixture, arms extending from said piston rod, links interposed between said arms and the wings and conjoining these two elements to transform the reciprocatory into oscillatory motion and impart the latter to the wings.

19. In an aircraft, the combination of a body, a pair of transverse, symmetrically disposed wings in biplane fashion hinged to said body, the transverse supporting members of said superposed wings being located forward of the line of action of the resultant airforce, spring means tending to increase the angle of attack of said wings, a pair of spaced, vertically positioned, alined cylinders, a piston head in each cylinder, a piston rod connecting said heads, a carburetor, orifices and exhaust ports in said cylinders, means to feed the combustible mixture into said cylinders and to remove the spent gases therein, means for igniting said mixture, links interposed between said piston rod and the said wings, and conjoining these elements to transform the reciprocating into oscillating motion of the wings.

20. In an aircraft, the combination of a body, a multiple number of transverse superposed wings oscillating about longitudinal axes, each wing being symmetrically disposed and balanced, the transverse supporting members of said superposed wings being located forward of the line of action of the resultant airforce, spring means tending to increase the angle of attack of said wings, a pair of spaced, vertically positioned, alined cylinders, a piston head in each cylinder, a piston rod connecting said heads, a carburetor, orifices and exhaust ports in said cylinders, means to open said orifices and exhaust ports in proper sequence, means to feed the combustible mixture into said cylinders and to remove the spent gases therein, means for igniting said mixture, links interposed between said piston rod and the lowest wing, and between the wings themselves, to conjoin these elements and to concurrently oscillate the said wings.

21. In an aircraft, the combination of a body, a centrally positioned, transverse balanced wing oscillating about an axis that is parallel to the longitudinal axis of the aircraft, the transverse internal supporting member being positioned forward of the line of action of the resultant airforce, resilient members tending to increase the angle of attack of said wing, a pair of spaced, vertically positioned, alined cylinders, a piston rod connecting said pistons, a carburetor, orifices and exhaust ports in said cylinders, means to open and shut said orifices and exhaust ports in proper sequence, means to feed the combustible mixture into said cylinders and to remove the burnt gases therein, means for igniting said mixture, and links interposed between said piston rod and the wing to impose on the latter a rapid oscillation in coaction with the reciprocating pistons.

WILLIAM STELZER.